Feb. 3, 1931.     H. V. WELCH     1,790,961
ELECTRICAL PRECIPITATION APPARATUS
Filed June 12, 1929     4 Sheets-Sheet 1
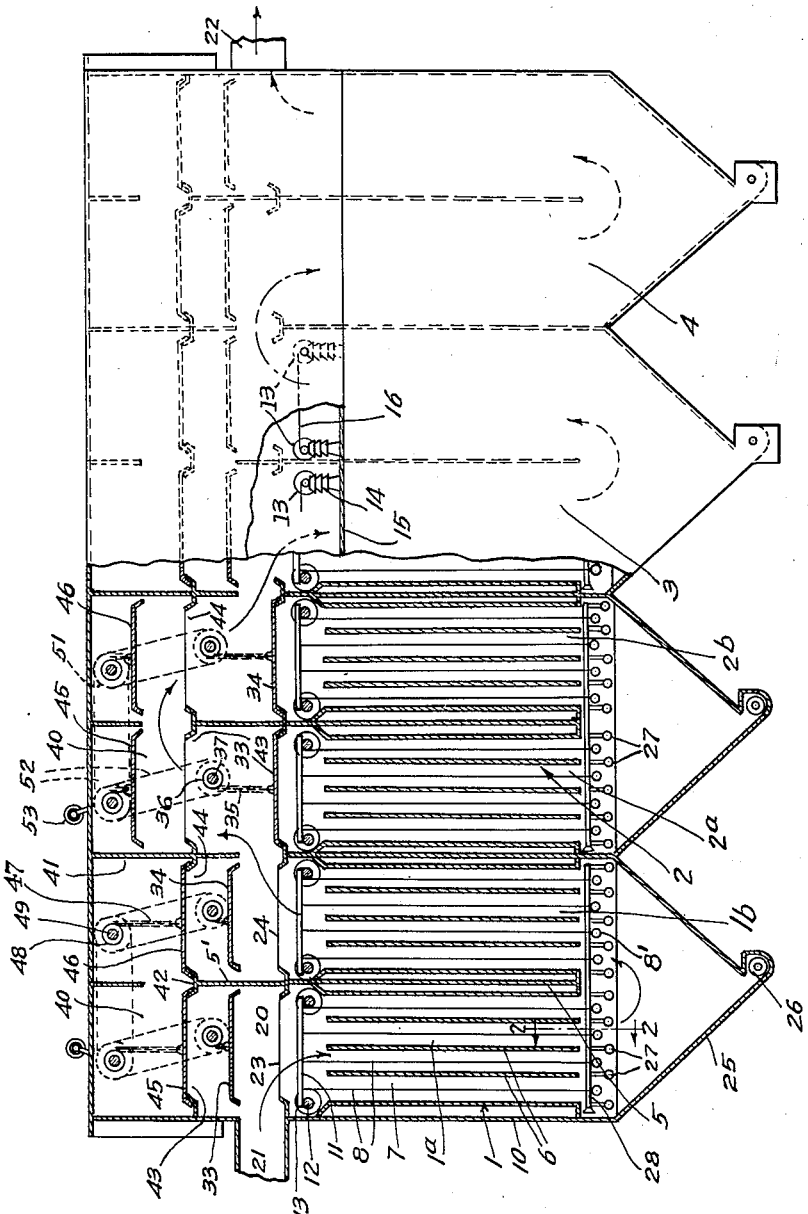
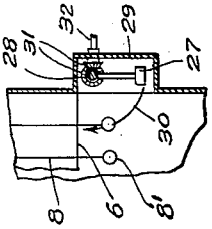
INVENTOR.
Harry V. Welch.
BY Arthur P. Knight and
Alfred W. Knight
ATTORNEYS

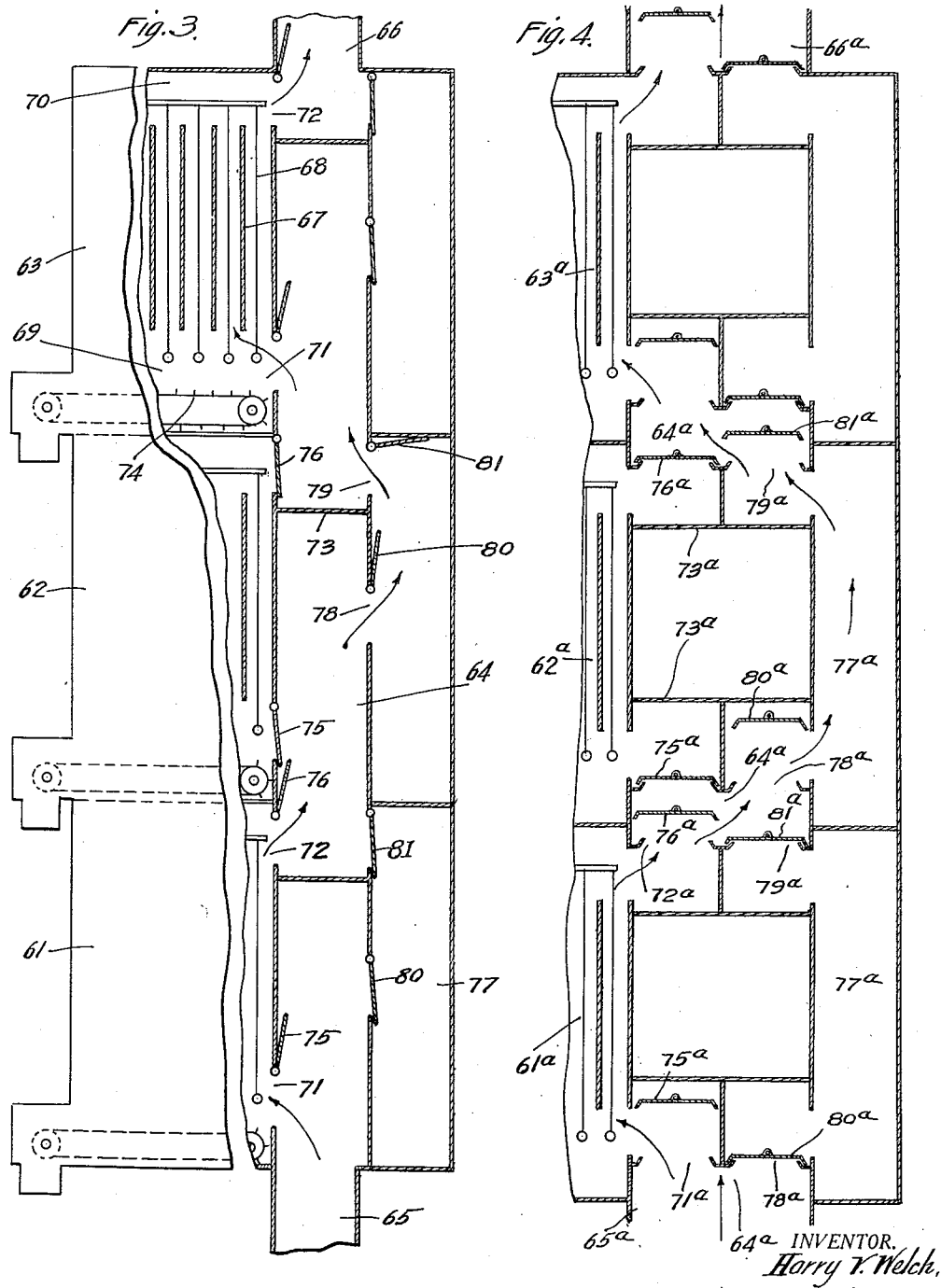

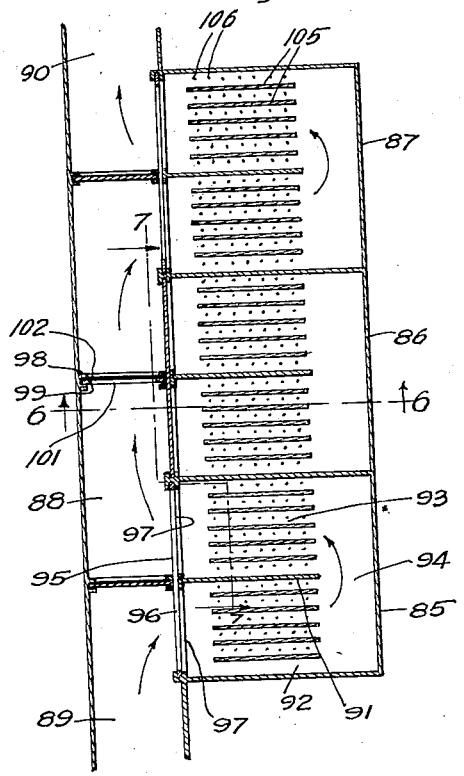
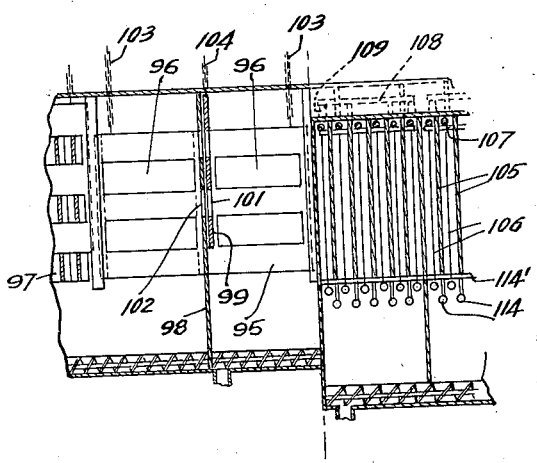
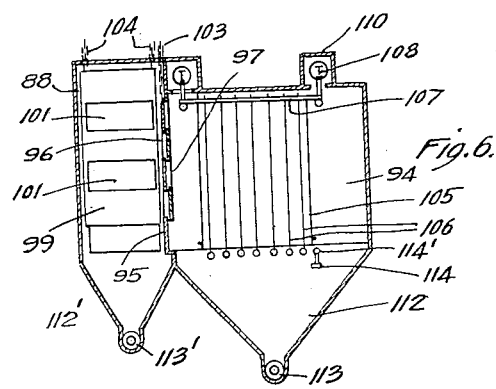

Feb. 3, 1931.  H. V. WELCH  1,790,961
ELECTRICAL PRECIPITATION APPARATUS
Filed June 12, 1929  4 Sheets-Sheet 4
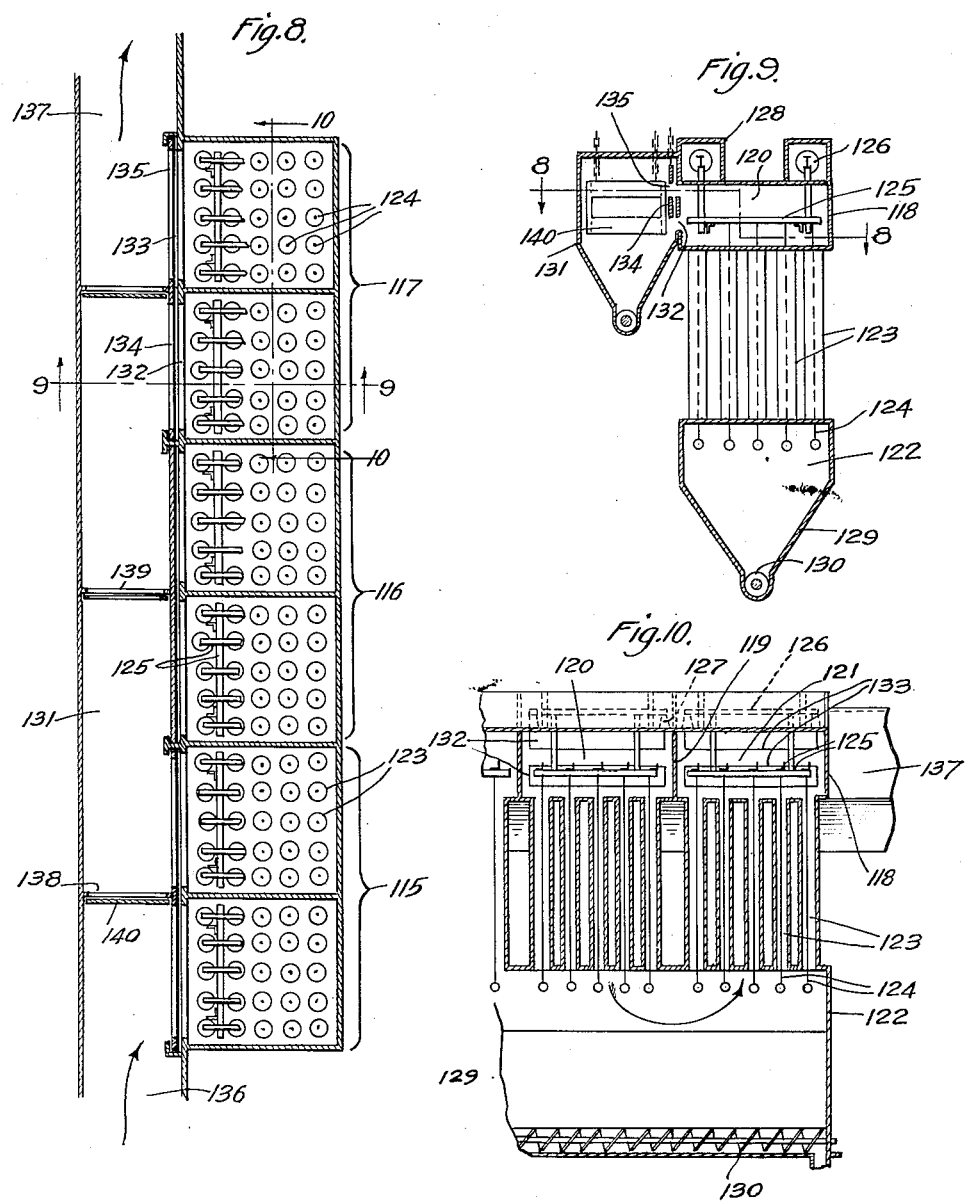
INVENTOR.
Harry V. Welch,
BY Arthur P. Knight and
Alfred W. Knight
ATTORNEYS Patented Feb. 3, 1931

1,790,961

UNITED STATES PATENT OFFICE

HARRY V. WELCH, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA

ELECTRICAL PRECIPITATION APPARATUS

Application filed June 12, 1929, Serial No. 370,248, and in Australia August 1, 1928.

This invention relates to apparatus for electrical precipitation of suspended particles from gases and the principal object thereof is to provide for the arrangement of a plurality of units of an electrical precipitation installation so as to normally permit passage of the gas to be treated through all of said units in series and to also readily permit any one or more of said units to be temporarily disconnected from the series without interfering with the passage of the gas through the remaining units.

In the art and practice of the electrical precipitation of suspended particles from gases by what is known as the Cottrell process it has commonly been the practice to divide the installation into two or more units operating in parallel.

The necessity for the parallel operation arises from the fact that the gas flow from the furnaces must be continuously received and provision must be made by which a portion of the installation may be put out of commission for various reasons, such as for repairs or renewal of electrodes or cleaning and without interruption of the gas flow.

It is recognized that in an electrical precipitation installation where only two units are operated in parallel, the closing down of one unit forces double the volume of gas through the other with consequent reduction in the efficiency of the precipitation of the suspended particles from the gases.

To reduce this disadvantage of overburdening one unit, installations consist of an extended number of units operating in parallel, an example being a plant with 20 units in parallel so that the taking out of commission of one unit increases the gas burden on the remaining units only 5 percent.

There are, however, disadvantages in operating a large number of units in parallel and it is recognized that equal efficiencies at greatly reduced construction cost and simplicity of operation can be secured by a series operation of the units, but no practical means have been provided whereby one or more units in the series can be closed down without adversely affecting the operation of the remaining units.

The present invention has been devised to provide means whereby one or more units in a series installation can be withdrawn from service at any time without affecting the functioning of each of the remaining units in operation.

Broadly stated the essential feature of the present invention consists in the provision of means associated with the units whereby, on the closing down of any one or more of the units in the series, the gases can be diverted or by-passed away from the said inoperative unit to the next following unit in operation or to the delivery outlet from the series.

In a practical form of the invention the means mentioned for the purpose of effecting the by-passing of the gases consists broadly of valvularly controlled flue passages associated with the series of units in such a way that the gases fed into the delivery flue to each unit may be diverted at any point and conducted further ahead in the series.

The precipitation installation preferably comprises a plurality of electrical precipitation units, a main flue extending alongside (for example above or at one side of) all of said units, means normally obstructing direct flow of gas through said flue so as to cause the same to be diverted from the flue into and through the several units in series, means for shutting off communication between said flue and any one of said units independently, and means for permitting direct passage of the gas past any unit thus cut off and to the next succeeding unit.

The accompanying drawings illustrate electrical precipitation apparatus embodying this invention and referring thereto:

Fig. 1 is a partly sectional side elevation of such an installation.

Fig. 2 is a section on line 2—2 in Fig. 1.

Fig. 3 is a partly sectional side elevation of another form of installation according to this invention.

Fig. 4 is a partial vertical section of another modification of the invention.

Fig. 5 is a horizontal section of another modified form of apparatus.

Fig. 6 is a section on line 6—6 in Fig. 5.
Fig. 7 is a section on line 7—7 in Fig. 5.
Fig. 8 is a horizontal section of another modification of the invention, taken on line 8—8 in Fig. 9.
Fig. 9 is a section on line 9—9 in Fig. 8.
Fig. 10 is a section on line 10—10 in Fig. 8.

The electrical precipitator shown in Fig. 1 comprises a plurality of electrical precipitator units indicated at 1, 2, 3 and 4, said units being disposed side by side, and each comprising a housing 10 separated by a vertical partition 5 into a downflow portion such as 1a, 2a, etc., and an upflow portion such as 1b, 2b, etc. Within each of said portions of the precipitator units are provided a plurality of collecting electrodes 6 consisting, for example, of parallel plates or the like providing gas passages 7 therebetween, and a plurality of discharge electrode means 8 consisting, for example, of fine wires or small rods disposed within said passages. The collecting electrodes 6 may be supported upon the housing means 10 of the respective sections in any suitable manner and may be electrically connected thereto and grounded. The discharge electrodes may also be supported and insulated from the collecting electrodes in any suitable manner, but I have shown the same as consisting of fine wires provided with tensioning weights 8' at their lower ends and supported at their upper ends on bars 11, which are in turn supported on bars 12 which project through openings 13 in the side walls of the housing and are supported at their ends on insulators 14 in insulator compartments 15. The discharge electrode system may be connected in any suitable manner to the high tension side of a suitable supply of electric power. For example, the rods 12 may be connected as by wires 16 to the high tension side of a source of unidirectional electric power at a sufficient voltage to maintain the necessary discharge for effective precipitation, the other side of said power source being grounded and also preferably electrically connected to the collecting electrodes.

Across the top of all of said precipitator units extends a main flue 20 having inlet means 21 at one end and outlet means 22 at the other end. The vertical partitions 5 aforesaid which divide the downflow and upflow portions of the respective units are shown as extended upwardly at 5' across the flue 20 so as to obstruct said flue and normally cause the gas to be diverted therefrom through the respective sections. Said flue communicates with the downflow portion of each unit through inlet opening 23 and with the upflow portion thereof through outlet opening 24. The downflow and upflow portions of each unit are in communication with one another at their lower ends, as through the upper portion of a hopper shaped bottom 25, which is preferably provided with means such as screw conveyor 26 for effecting removal of collected dust or precipitated matter therefrom.

Any suitable mechanically or manually operated means may be provided for removing precipitated material from the collecting electrodes and also if desired for removing precipitated material from the discharge electrodes. I have shown, for example, in Figs. 1 and 2, cleaning means for the collecting electrodes consisting of a plurality of hammers or rapping elements 27 mounted upon a shaft 28 extending within a recessed compartment 29 at one side of the hopper bottom of each unit and in positions to strike against the lower ends of the several collecting electrodes upon rotation of said shaft in the direction indicated by the arrow at 30 in Fig. 2. Said shaft may be rotated in any suitable manner as for example by means of gears 31 and operating shaft 32 it being understood that shaft 28 is rocked back and forth to alternately move the hammers 27 between the position shown in Figs. 1 and 2 and position of impact with the collecting electrodes. Such cleaning means may, however, be of any other suitable type, and constitute no essential part of the present invention. They are, however, shown in order to indicate that some form of cleaning means may be provided for the electrodes, as one of the principal advantages of the invention is realized particularly in connection with the cleaning of the electrodes, namely, the ability to cut off from the gas stream any desired one of the units and momentarily by-pass the gas past such unit when it is desired to operate the electrode cleaning means for such unit.

The means for cutting off communication from the main flue to each of the precipitator units independently is shown as comprising valve means such as dampers 33 and 34 of the type ordinarily known as "jug" dampers, which are normally held in raised position as indicated in unit 1 in Fig. 1 but which may be lowered to position to close the inlet and outlet openings 23 and 24 respectively, as shown in unit 2 in Fig. 1. Said dampers may be supported and operated by means of chains 35 or the like wound on drums 36 on shafts 37. Furthermore, in order to permit direct passage of the gas through the flue and beyond the obstructing partition 5' corresponding to any unit which is thus cut off therefrom, I prefer to provide a by-pass chamber 40 above or adjacent the portion of flue 20 opposite each of the precipitator units. Said chambers are separated from one another by partition means 41 and from flue 20 by partition means 42. Each of said by-pass chambers, however, communicates through openings 43 and 44 respectively with the flue 20 at the inlet and outlet sides of the partition 5' of the corresponding unit, and said openings are normally closed by valve means such as jug dampers 45 and 46. Said dampers are shown in closed position in unit 1 in Fig. 1 but are shown as raised to open position in unit 2. Said dampers may also be operated by means of chains 47 mounted on drums 48 on shafts 49. In order to provide for simultaneous opening of both dampers 33 and 34 and closing of both dampers 45 and 46, and vice versa, for each unit, I prefer to operatively inter-connect all of the damper operating shafts 37 and 49 for any one unit. For example, each of said shafts may be provided with a sprocket 51 and said sprockets may be connected to one another by means of chains 52. Any one of said sprockets may be provided with operating means such as crank 53, whereby all of the dampers for the corresponding unit may be operated simultaneously, it being noted that the chains 47 are wound upon their drums in reverse direction to the chains 35, so that the dampers 33 and 34 will be lowered when the dampers 45 and 46 are raised and vice versa.

It will be understood that during normal operation of the above described precipitation installation of the dampers for all of the units may be in the positions shown for unit 1, so that the gas to be treated, and containing suspended particles, enters through inlet means 21 and passes thence through all of the units in series and out through outlet means 22. In each of said units the gases pass from flue 20 first downwardly through inlet opening 23 and through the downflow portion such as 1a and then upwardly through the upflow portion such as 1b and through outlet opening 24 to said flue, through which they are conducted to the next succeeding section. The precipitation operation proceeds in the usual manner, the necessary high potential difference being maintained between the electrodes so as to cause a silent or corona discharge from the discharge electrodes which, as is well understood, acts in conjunction with the electric field to cause precipitation of the suspended particles upon the collecting electrodes and sometimes also to a lesser extent on the discharge electrodes. The gas is thus subjected to repeated electrical precipitating operations and it may be stated that in general, and within reasonable limits, for a given number of precipitation units of a given size a greater precipitation efficiency can be obtained by passing the gas successively through all of said units in series, than by passing the gas only once through all of the units in parallel.

With the arrangement above described when it is desired to clean the collecting electrodes of any one of the units, or when it is desired for any other reason to interrupt the passage of the gas through said unit, as for example to permit repair or replacement of parts therein, the dampers for that unit may be moved simultaneously to the positions shown for unit 2 in Fig. 1. With the dampers in these positions, the gas flow through the installation is as shown by the arrows in said figure. The gases from unit 1 pass through flue 20 to opening 43 and through said opening to the by-pass chamber 40 of unit 2, and thence through opening 44 and flue 20 to the inlet opening of unit 3, and then through units 3 and 4 in the usual manner. It is evident that both the downflow and upflow portions of unit 2 are thus completely shut off from the gas stream so that the cleaning of the electrodes or any other desired operation therein may be carried out without interfering with the operation of the remaining units. Furthermore, the electrodes of unit 2 may be cleaned without causing the gas stream to pick up any of the precipitated material dislodged from the collecting electrodes during the cleaning operation, as would be the case if such electrodes were to be rapped while the gas was passing therethrough.

In the installation shown in Fig. 3 there are three units 61, 62 and 63 disposed one above another, and the main flue 64 extends upwardly at one side of all of said units, being provided with inlet means 65 and outlet means 66 at the lower and upper ends respectively, although it will be understood that the gas could also be passed downwardly instead of upwardly through the apparatus. Each unit is shown as provided with collecting electrodes 67 and discharge electrodes 68, supported and insulated from one another in any suitable manner and provided with suitable means such as above described for maintaining the necessary difference of potential therebetween. Each unit is also provided with lower and upper headers or compartments 69 and 70 respectively, which communicate with flue 64 by means of inlet and outlet openings 71 and 72 respectively. Transverse partition members 73 extend across flue 64 between the inlet and outlet openings for each unit, so as to normally divert the gas from the flue through said unit. Suitable means such as above described may be provided for rapping or otherwise cleaning the electrodes of the individual units, and means such as endless conveyors 74 may be provided in the lower headers of the respective units for carrying away the precipitated material.

The means for shutting off any one of the units from the flue is shown in this case as comprising hinged dampers 75 and 76 adapted to control the inlet and outlet openings 71 and 72 of the respective units, said dampers being shown in open positions in units 61 and 63 and in closed positions in unit 62. By-pass chambers 77 are also provided for the respective units, each of said chambers communicating through openings 78 and 79 with flue 64 before and beyond the corresponding partition 73, said openings being also controlled by hinged dampers 80 and 81 respectively, which are shown in closed positions in units 61 and 63 and in open position in unit 62.

The operation of this form of the invention is the same in principle as that above described and is believed to require no further explanation. With the dampers in the positions shown the direction of gas flow through the installation is as indicated by the arrows and it will be seen that at this time unit 62 is entirely shut off from the gas stream for the purpose of cleaning the electrodes or for any other purpose.

The arrangement of the precipitation units 61a, 62a and 63a in Fig. 4 is similar to that shown in Fig. 3, but I have shown in this case the use of jug type dampers for controlling the communication between the main flue and the several units, instead of hinged dampers. The main flue 64a, provided as before with inlet and outlet connections 65a and 66a, communicates through inlet and outlet openings 71a and 72a with the lower and upper portions of the several units, and double partitions 73a extend across said flue between the inlet and outlet openings for each unit. The by-pass chambers 77a also communicate with the main flue 64a below and above the partition means 73a, through openings 78a and 79a. Dampers of the jug type, indicated at 75a, 76a, 80a and 81a are in this case provided for controlling the openings above mentioned, and said dampers may be operated between closed and open positions in any suitable manner, for example, by means similar to those shown in Fig. 1.

It will be seen that with the several dampers in the positions shown in Fig. 4 the gas will pass through unit 61a but will be diverted from unit 62a through the corresponding by-pass chamber 77a and will then pass through the unit 63a, as indicated by the arrows, and no further description of the operation of this particular form of the invention is believed to be necessary.

The adaptation of my invention to a somewhat different type of precipitation unit and with a different type of damper is illustrated in Figs. 5 to 7 inclusive. In this case three precipitation units 85, 86 and 87 are disposed side by side and the main flue 88 extends along one side of all of said units and is provided with inlet connection 89 at one end and outlet connection 90 at the other end. A partition wall 91 extends from the side of each unit adjacent flue 88 along the center of said unit to a point spaced somewhat from the other side of the unit so as to divide the interior thereof into two portions 92 and 93 communicating with one another through the opening 94, so that the gas is caused to follow a U-shaped horizontal path of flow through each precipitation unit connected to the flue, as indicated by the arrows in units 85 and 87.

Communication between the flue 88 and the respective units is in this case controlled by vertically sliding dampers 95 of the multivane type, each of said dampers being provided with a plurality of openings 96 adapted to be moved into or out of position of register with corresponding openings 97 in the side walls of the respective units. Partitions 98 are also provided extending across flue 88 in line with the partitions 91 of the respective units, and vertically sliding multivane dampers 99 are mounted adjacent each of said partitions 98, said last mentioned dampers being provided with a plurality of openings 101 adapted to be moved into or out of register with corresponding openings 102 in said partition. The dampers 95 and 99 may be raised and lowered in any suitable manner as by means of chains 103 and 104 respectively.

The electrode means are shown in this case as comprising collecting electrodes 105 of the plate type supported within the portions 92 and 93 of the several units in any suitable manner, and discharge electrodes, such as wires 106 disposed in rows between the adjacent collecting electrodes and supported at their upper ends on bars 107 which are in turn supported from bars 108 mounted on insulating supports 109 in insulator compartments 110 mounted above the precipitator housing. The several units are also shown in this case as provided with hopper shaped bottoms 112 having screw conveyor 113 for removal of collected material, and the flue 88 is also shown as having a hopper shaped bottom 112′ provided with screw conveyor 113′ for removal of any material collecting at the bottom of said flue. Suitable means, such as rapping hammers 114 mounted on rocking shafts 114′, may be provided for cleaning the collecting electrodes 105 of the several units.

In this case the dampers 95 for sections 85 and 87 are shown in open position while the damper 95 for unit 86 is shown in closed position, and dampers 99 are shown in closed position for units 86 and 87 and in open position for unit 86, so that the gases are caused to by-pass unit 86. It will be understood, however, that either of the other units may be by-passed in similar manner and also that in normal operation all of the dampers 95 will be opened and all of the dampers 99 closed so that the gases are passed in series through all of the units.

In the modification of the invention shown in Figs. 8 to 10 inclusive, I have shown three units 115, 116 and 117 disposed side by side and each comprising an upper header 118 divided by partition 119 into inlet and outlet compartments 120 and 121, a lower header 122 and a plurality of vertical pipes or tubes 123 extending between the lower header and the inlet and outlet compartments. Said pipes or tubes constitute gas passages for conducting the gas first downwardly from inlet compartment 120 to the lower header 122 and then upwardly to the outlet compartment 121. A vertical discharge electrode member 124, consisting for example of a wire or fine rod, weighted or otherwise tensioned at its lower end extends centrally within each of the pipes 123, and said discharge electrodes are shown as hung from a supporting frame 125 which is in turn supported from bars 126 mounted on insulating supports 127 in insulator compartments 128 above the upper header. Each of the lower headers 122 is preferably provided with a hopper shaped bottom 129 having means such as screw conveyor 130 for removal of collected material therefrom.

The main flue 131 extends alongside the upper headers 118 of all of the units and is connected to the inlet and outlet compartments thereof through openings 132 and 133 respectively, which are controlled by multi-vane sliding dampers 134 having openings 135. Said flue is provided with inlet and outlet connections 136 and 137 respectively and with transverse partitions 138 disposed between the inlet and outlet openings of the respective units. Said transverse partitions are also provided with openings 139 controlled by multi-vane sliding dampers 140.

In the normal operation of this form of the invention all of the dampers 140 are closed and all of the dampers 134 are open, so that the gases pass through all of the units in series, passing first through inlet opening 132 and inlet compartment 120, then downwardly through the pipes 123 of the downflow portion, through the lower header 122, thence upwardly through the pipes 123 of the upflow portion and through outlet compartment 121 and outlet openings 123 back to the main flue, and so on through all of the units. In Fig. 8, however, the dampers 134 for unit 116 are shown as closed while the damper 140 therefor is shown as open, so that the gases are caused to by-pass this unit and to pass through flue 131 directly from the outlet of unit 115 to the inlet of unit 117. With the dampers in these positions unit 116 is entirely shut off from the gas stream so as to permit cleaning of the electrode therein in any suitable manner, as for example by manual rapping of the pipes 123, or to permit any other desired operation to be carried out therein.

I claim:

1. An apparatus for electrical precipitation comprising a plurality of electrical precipitation units, a main flue extending alongside all of said units, means normally obstructing direct flow of gas through said flue so as to cause the gas to be conducted from the flue into and through the several units in series, means for shutting off communication between said flue and any one of said units independently, and means for permitting direct passage of the gas past any unit thus cut off.

2. An apparatus for electrical precipitation comprising a plurality of electrical precipitation units having inlet and outlet openings, a flue extending alongside all of said units and communicating with the inlet and outlet openings thereof, normally open damper means controlling communication between the flue and said inlet and outlet openings, means establishing direct communication, independently of the respective units, from the point of communication of the flue with the inlet opening of each unit to the point of communication of said flue with the outlet opening of said unit, normally closed damper means controlling said direct communication means, and means for closing said first named damper means and opening said last named damper means.

3. An apparatus as set forth in claim 2, in which all of the damper means for any one unit, and for the corresponding direct communication means are operatively interconnected so as to cause closing of said first named damper means simultaneously with the opening of said last named damper means, and vice versa.

In testimony whereof I have hereunto subscribed my name this 1st day of June, 1929.

HARRY V. WELCH.